US007774206B1

(12) United States Patent
Cook

(10) Patent No.: US 7,774,206 B1
(45) Date of Patent: Aug. 10, 2010

(54) METHOD FOR PROVIDING COMMUNICATION SERVICES

(75) Inventor: Fred S. Cook, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 3148 days.

(21) Appl. No.: 09/909,445

(22) Filed: Jul. 19, 2001

(51) Int. Cl.
*G06Q 10/00* (2006.01)
*G06Q 30/00* (2006.01)

(52) U.S. Cl. ................ 705/1; 705/7; 705/10; 455/3.01; 455/414.1; 379/201.01

(58) Field of Classification Search ..................... 705/2, 705/1, 7, 8, 9, 10, 26; 709/1, 219, 227, 228; 455/419, 3.01, 414.1; 379/201.01
See application file for complete search history.

(56) References Cited

U.S. PATENT DOCUMENTS 5,577,100 A * 11/1996 McGregor et al. .......... 455/406
5,915,214 A * 6/1999 Reece et al. ................ 455/406
6,466,783 B2 * 10/2002 Dahm et al. ............. 455/414.2
6,678,514 B2 * 1/2004 Wheeler et al. .......... 455/404.1
6,732,176 B1 * 5/2004 Stewart et al. .............. 709/227

OTHER PUBLICATIONS

Mobile Phone with Internal Accounting ( Donal Scott McGregor Pub. No. US2004/0097220 A1.*
Antoniak, M., "Wooing today's business travelers", U.S. News & World Report, v113, n17, p. 75, Nov. 2, 1992.*
Schwartz, L. "Big Apple Meeting", Travel Agent, v297, n2, p. 92, Oct. 11, 1999.*

* cited by examiner

*Primary Examiner*—Tan Dean D Nguyen

(57) ABSTRACT

A method of providing communication services from retail business locations. The method comprising providing wireless transceiver devices to customers of the retail business, wherein the wireless transceiver devices are configured to receive at least one of a variety of different communication services. Contracting for the plurality of different communication services from a network system by the retail business. Contracting with a wireless service provider for wireless network services to exchange the plurality of different communication services between the retail business and the wireless transceiver devices. Receiving in at least one location of the retail business, the plurality of different communication services from the network system and providing at least one of the plurality of different communication services from the retail business location to the wireless transceiver devices via a wireless network.

10 Claims, 4 Drawing Sheets

METHOD FOR PROVIDING COMMUNICATION SERVICES

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to communication services, and specifically, to a method for providing communication services from retail business locations.

2. Description of the Prior Art

Communication service providers offer a variety of communication services to their customers. These services are provided to customers by a variety of different methods according to the type of service subscribed to by a customer. The customers in turn pay for the services by a variety of different methods. For example, in some cases, customers pay an access fee for a limited amount of service usage. In other cases, customers pay both an access fee and a service charge based on the amount of service usage. In still yet other examples, access equipment is also provided to the customer to permit the customer to access and use the communication service. The access equipment is typically sold, rented, or provided to the customer for free along with a service subscription.

The relationship between an Internet service provider ("ISP") and its customers illustrates one example of a communication service provider providing a communication service to customers. In this case, customers of the ISP pay a monthly fee for services such as email, web hosting and access to the World Wide Web. Another example is illustrated by the relationship between a cable television service provider and its customers. Here, customers subscribing to the cable service pay a monthly charge for a specific number of cable channels. Additional services such as pay-per-view events may also be purchased from the service provider for an additional charge. To receive the pay-per-view event, the customer must rent or buy a cable box from the service provider. The cable box connects to the customer's television and permits viewing of the pay-per-view event. In another example, a customer subscribing to a dish network service may desire to purchase a pay-per-view event. In this case, no additional equipment is required as the pay-per-view event is received over a satellite dish and dish network box already owned or rented by the customer. The customer is, however, charged an additional fee for receiving the event.

Unfortunately, the flexibility by which these services are provided is limited because customers must contract directly with each individual service provider for access to that service provider's service. Furthermore, services such as pay-per-view are typically not offered unless the customer also subscribes to the underlying cable service. In the case of the Internet access, the customer must also have access to a computer or other device that permits access to the Internet service. Finally, these services are not offered to customers on a temporary basis. Customers must enter service contracts that are typically not less than a month.

SUMMARY OF THE INVENTION

The present invention advances the art through a method for providing a plurality of different communication services from retail business locations. According to the method of the present invention, a retail business contracts with a network system to provide the plurality of different communication services to the retail business. The retail business also contracts with a wireless network service provider to exchange the plurality of different communication services between the retail business and wireless transceiver devices. The wireless transceiver devices are provided by the retail business to customers of the retail business on a rental basis. In some examples of the present invention, the wireless transceiver devices could also be sold to customers of the retail business. The wireless transceiver devices are configured to receive at least one of the plurality of different communication services from the retail business via the wireless network, and provide that communication service to the customer. In the context of the present invention, a retail business is defined as a business providing retail services and having one or multiple locations. Those skilled in the art will appreciate however, that the method according to the present invention could be applied to any third party non-service provider to permit the third party non-service provider to provide communication services.

The plurality of different communication services could be any communication services capable of being provided over a wireless medium to the wireless transceiver devices. The wireless transceiver devices could be conventional wireless devices configured to receive at least one of the plurality of different communication services and provide that communication service to the customer.

A first advantage of the present invention is that consumers are provided with a variety of different communication services on demand. For example, consumers who desire a service such as video conferencing could rent a pair of wireless transceivers from a participating retail business and be provided with instant video conferencing services without the need to purchase and install customized video conferencing equipment. In another example, a traveling business consumer could conference into existing equipment at the home office using a rented transceiver. A second advantage of the present invention is that the plurality of different communication services could be provided to any location where wireless service is available. Thus, so long as the wireless network is able to communicate with the wireless transceiver device provided by the retail business, one or multiple communication services could be provided to consumers without connecting to existing communication links such as telephone or cable connections. A third advantage of the present invention is the convenience of having a variety of different communication services available from a virtually unlimited number of locations, e.g. retail business locations. A fourth advantage of the present invention is that the wireless transceiver devices could be provided to consumers for a predetermined period of time customized to fit an individual consumers' specific requirements. For example, the wireless transceiver devices could be provided to consumers on an hourly, daily, monthly or even by the minute basis. Thus, a consumer could visit a participating retail business location, use a wireless transceiver device to access a communication service while at the retail business location, and be charged only for the time the wireless transceiver device was actually in use by the consumer.

DETAILED DESCRIPTION OF THE PREFERRED EMBODIMENT

Figure 1:
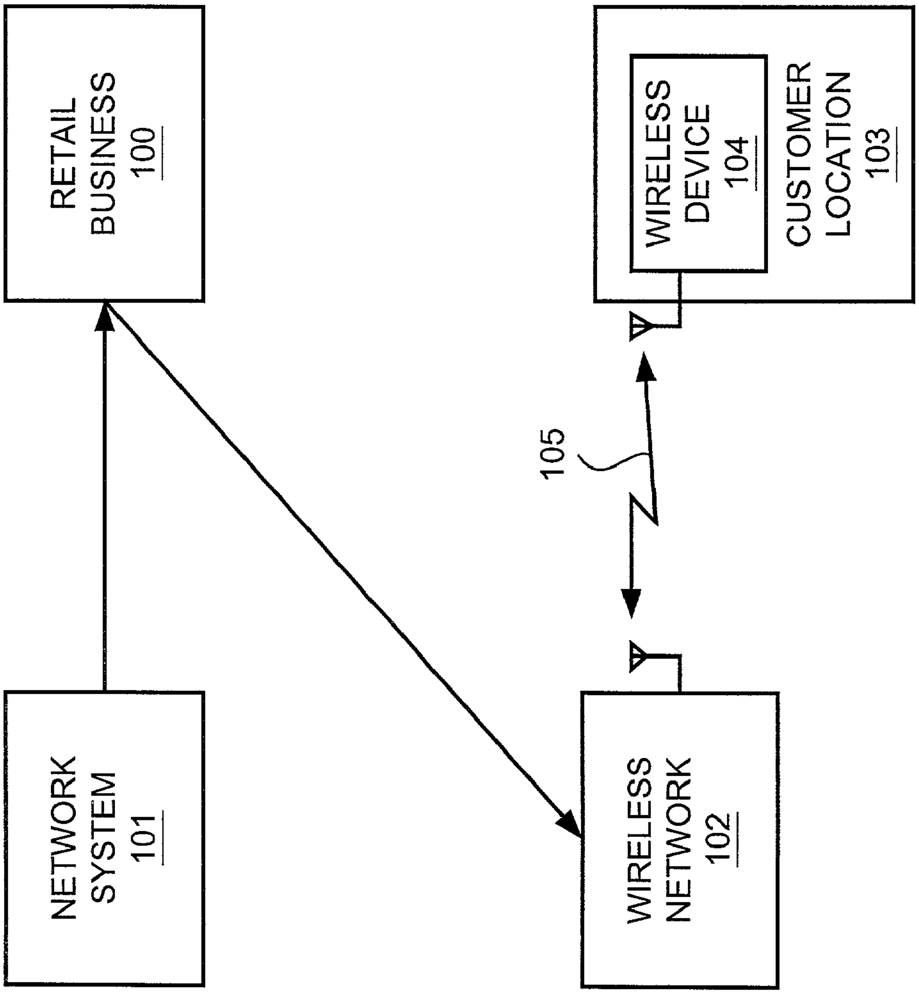
FIG. 1 illustrates a system configuration for the method according to the present invention.

System Configuration FIG. 1:

The following description and associated figures discuss specific examples intended to teach the present invention to those skilled in the art. Those skilled in the art will appreciate numerous variations from these examples that do not depart from the scope of the invention.

FIG. 1 depicts a network system 101, a retail business 100, a wireless network 102, and a customer location 103. The customer location 103 includes a wireless transceiver device 104 and could be any location where the wireless network 102 can communicate with the wireless transceiver device 104. The retail business 100 is connected to the wireless network 102 and to the network system 101. As will become apparent from the following description, the retail business 100 could be connected to the network system 101 and the wireless network 102 by conventional wireline or wireless connections.

The network system 101 could be any one or more public or private networks configured to provide the plurality of different communication services. Additionally, the one or more public or private networks could be wireline networks or wireless networks. Those skilled in the art will appreciate that in some examples of the present invention, the network system 101 could include the wireless network 102 along with one or more other public and/or private wireline or wireless networks. Some examples of the network system 101 are a data network, an internet network, a telephony network, or a data network connected to a telephony network and an internet network. Thus, the network system 101 could comprise the public switched telephone network ("PSTN") or the PSTN connected to an asynchronous transfer mode ("ATM") network or an Internet Protocol ("IP") network. The network system 101 could also comprise a personal communication services ("PCS") network, a Local Area Network ("LAN"), a Wide Area Network "(WAN"), or a LAN connected to a WAN. The network system 101 is configured to bill, authorize, and exchange communication services with the retail business 100. Those skilled in the art will appreciate that the network system 101 would include various conventional components not shown on FIG. 1 for clarity.

The wireless network 102 could be any wireless network configured to exchange communication services between the retail business 100 and the wireless transceiver device 104. Some examples of the wireless network 102 include without limitation, a PCS network, cellular network, global system for mobile communication network or a low earth orbiting satellite network. Those skilled in the art will appreciate that the wireless network 102 would include various conventional components not shown on FIG. 1 for clarity.

The wireless transceiver device 104 could be any wireless transceiver device configured to exchange communications with the wireless network 102 and receive at least one of a plurality of different communication services from the retail business 100 via the wireless network 102. One example of the wireless transceiver device 104 is a high resolution portable video display system used to provide a video on demand service. Another example of the wireless transceiver device 104 is a high-speed transceiver system used to provide communication services such as video conferencing, internet connectivity, and telephony services. Some other examples of the wireless transceiver device 104 could include without limitation, personal data assistants, notebook computers, telephones, and other audio, video and data equipment customized for specific communication services.

The wireless network 102 communicates with the wireless transceiver device 104 over a wireless communication path 105. The wireless communication path 105 could be a conventional wireless communication path where communications are exchanged over the air. Some examples of the wireless communication path 105 include without limitation, a PCS path, a multichannel multipoint distribution service (MMDS) path, a millimeter wave path, code division multiple access (CDMA) path, a time division multiple access (TDMA) path, a spread spectrum path, and a microwave path.

The retail business 100 could be any retail business that desires to provide communication services to its customers. Some examples of the retail business 100 include without limitation, video stores, convenience stores, and grocery stores. The retail business 100 provides the communication services to its customers via contracts with the network system 101 and the wireless network 102. Operationally, the network system 101 provides the communication services to the retail business 100 under a contract between the network system 101 and the retail business 100. The retail business 100 provides the communication services to its customers under a contract with the wireless network 102 via the wireless transceiver device 104. The retail business 100 may rent, lease, or sell the wireless transceiver device 104 to customers of the retail business 100. In addition, the rental or lease term could be for a predetermined time period. The retail business or the customer could determine the length of the predetermined time period. Advantageously, the present method provides an easy means for consumers to access a plurality of different communication services on a temporary connectivity basis.

The plurality of different communication services could be any services available from the network system 101 that are capable of being provided over the wireless network 102 to the wireless transceiver device 104. Some examples of the communication services include without limitation, broadband voice, video, and data communications. Some examples of the voice, video, and data communications include without limitation, FAX communications, audio broadcasts, pay-per-view video broadcasts, direct television video broadcast, web browsing, data file exchange, e-mail, video conferencing, distance learning, remote diagnostics, collaborative design, video mail, professional conference facilities, virtual reality entertainment, gaming, etc.

Figure 2:
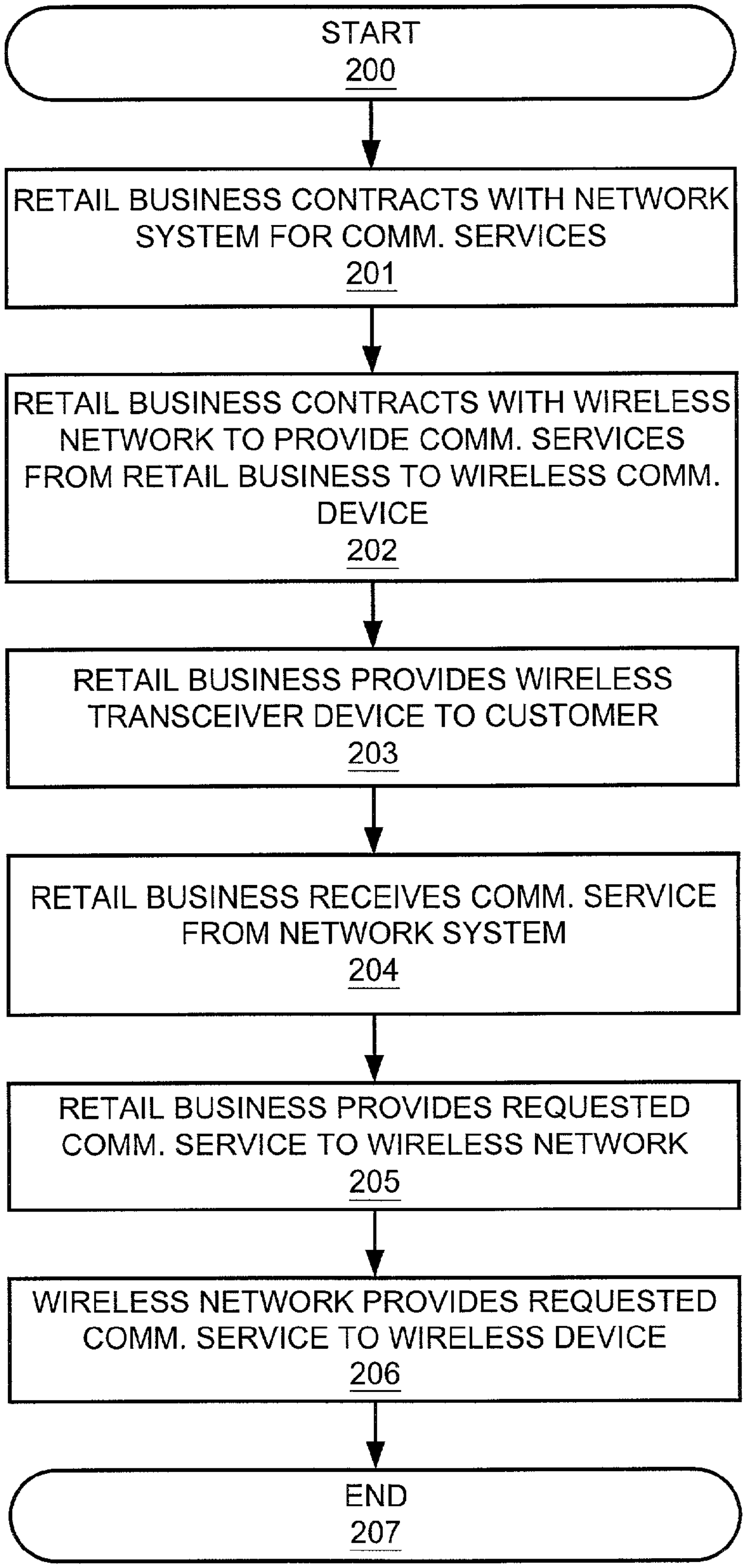
FIG. 2 is a flow chart illustrating an example of the method of the present invention.

Operation FIG. 2:

FIG. 2 is a flow chart illustrating an example of the method according to the present invention. On FIG. 2 the operation begins at step 200. At step 201, the retail business 100 contracts with the network system 101 for a plurality of different communication services to be provided to the retail business 100 for redistribution to customers of the retail business 100. For example, the retail business 100 could contract with the network system 101 for broadband backhaul services from a data network in the network system 101. The retail business 100 could also contract with the network system 101 for access to content information such as movies, on-line books and/or publishing services. At step 202, the retail business 100 contracts with the wireless network 102 to provide the plurality of different communication services from the retail business 100 to the wireless transceiver device 104. In response to the retail business 100 offering the plurality of different communication services, a customer visits the retail business 100 looking for one or more of the plurality of different communication services. At step 203, the retail business 100 provides the customer with the wireless transceiver device 104 in exchange for fee. Those skilled in the art will appreciate that there are numerous fee structures available to the retail business 100. For example, the fee could be in the form of a rental rate for the wireless transceiver device 104. The fee could also be in the form of a flat fee or charge for the one or more different communication services provided to the customer via the wireless transceiver device 104. The fee could also be a combination of rental rate and fee according to the number of services provided to the customer via the wireless transceiver device 104. At step 204, the retail business 100 receives the requested communication service(s) from the network system 101. At step 205, the retail business 100 provides the requested communication service to the wireless network 102. At step 206, the wireless network 102 provides the communication service to the wireless transceiver device 104, which in turn permits the customer to access the requested communication service. The operation ends at step 207.

Figure 3:
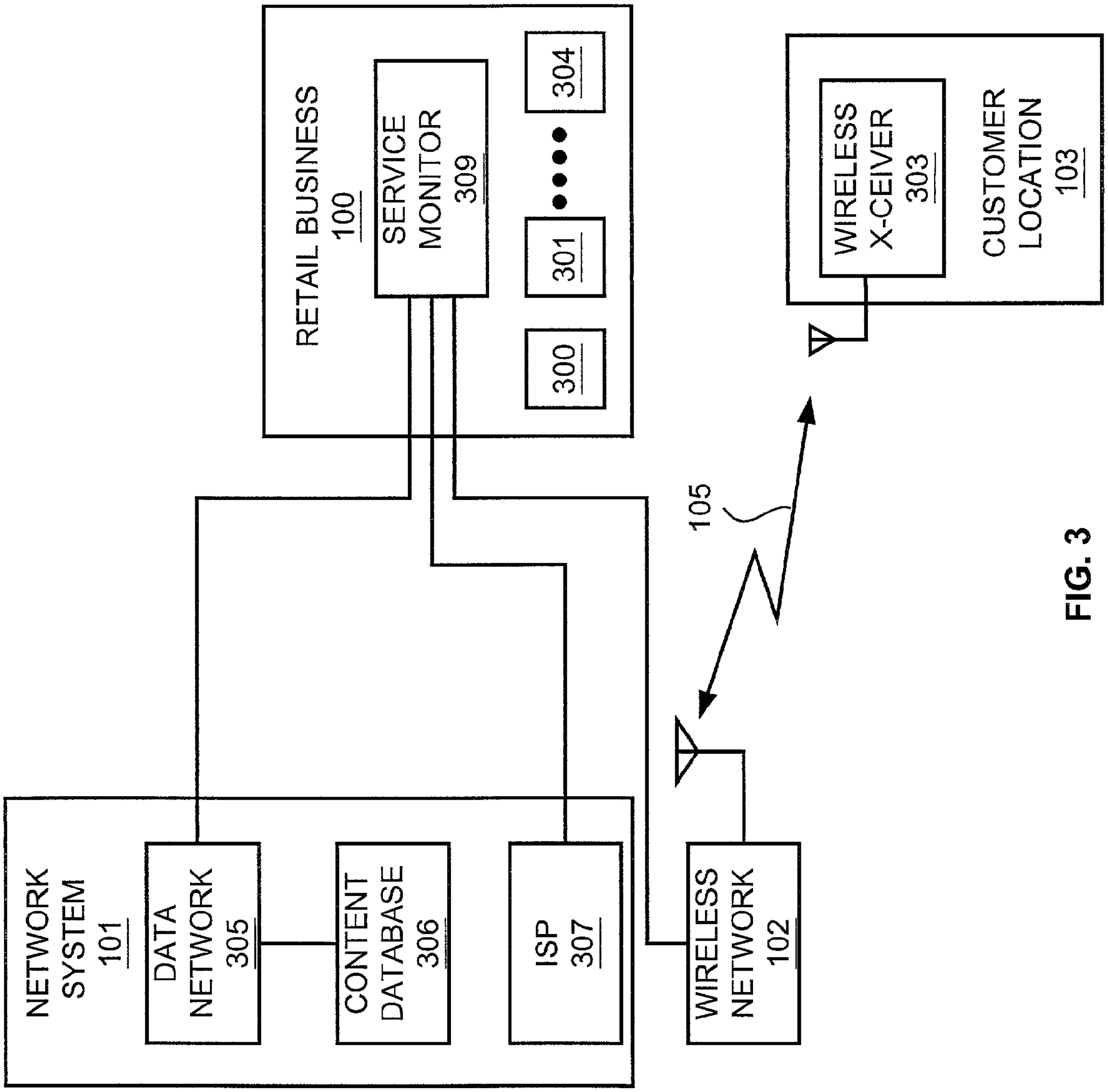
FIG. 3 is an example of a network configuration for the method according to the present invention.

Network Configuration FIG. 3:

FIG. 3 is an example of a network architecture for the method according to the present invention. It is anticipated however, that one skilled in the art will recognize numerous other examples in accordance with the principles described below, and thus, the following examples are for the purpose of illustration and not limitation. Those skilled in the art will also appreciate that various features described below could be combined to form multiple variations of the invention.

FIG. 3 depicts the retail business 100, the network system 101, the wireless network 102, and the customer location 103. The network system 101 comprises a data network 305, a content database system 306, and an ISP 307. The retail business 100 includes a service monitor 309 and a plurality of wireless transceiver devices 300, 301, and 304. The customer location 103 includes a wireless transceiver 303 that has been provided to a customer of the retail business 100. The service monitor 309 is connected to the data network 305, the ISP 307, and the wireless network 102. The data network 305 is connected to the content data base system 306.

The data network 305 could be a conventional data network such as an ATM network, integrated digital service network or frame relay network. The content database system 306 could be one or more databases configured to manage and exchange content information for the data network 305. Some examples of the content information include without limitation, movies, games, on-line books, as well as other conventional content information. The ISP 307 could be a conventional Internet service provider that provides connectivity to the World Wide Web as well as other services such as web hosting and email.

The service monitor 309 could be one or more processing systems configured to receive a plurality of broadband communication services from the data network 305 and the ISP 307. The service monitor 309 provides the plurality of broadband communication services to the wireless network 102 for transmission to one or more of the wireless transceiver devices 300-304. The service monitor 309 also provides transceiver cross connects and connection to the data network 305, the ISP 307, and the wireless network 102. Those skilled in the art will appreciate that the service monitor 309 could also provide cross connects and connection to other private networks and public networks not shown on FIG. 3 for clarity. The service monitor 309 manages requests for communication services from the wireless transceiver devices 300-304 and provides requested communication services to the requesting one of the wireless transceivers 300-304. The service monitor 309 could also bill, authorize, and manage access to the communication services provided to the retail business 100 from the data network 305 and the ISP 307. Some examples of the service monitor include without limitation, a Redback service management system or a Nortel Networks Shasta device.

In some examples of the present invention, the service monitor 309 could be connected to the wireless network 102 by a wireline communication path. In other examples of the present invention, the service monitor 309 and the wireless network 102 could exchange information over a wireless communication path using a pair of dedicated broadband wireless transceivers. In this case, the dedicated broadband wireless transceivers could be individually identified by electronic serial number to route all access to and from the dedicated transceivers through the retail business 100.

The wireless transceiver devices 300-304 could be conventional transceivers that exchange wireless communication services with the wireless network 102. Those skilled in the art will appreciate that the wireless transceiver devices 300-304 could be various different devices depending on the specific communication service desired by the customer. For example, in the case of a video on demand service, the wireless transceiver devices 300-304 could be a combination high resolution video portable display system/high speed transceiver system. In other examples of the present invention, the wireless transceiver devices 300-304 could be configured to connect to other devices such as computers, television sets, or stereos to provide a specific service to the customer.

The retail business 100 could have one or multiple locations that provide the wireless transceiver devices 300-304 to customers of the retail business 100. In the case of a retail business having multiple locations, each location could include a service monitor 309. Alternatively, a single service monitor 309 could be used in at least one location of the retail business 100 or hosted at a network system provider with administrative functions accessible from the retail business 100 to provide the communication services to the wireless transceiver devices 300-304. One skilled in the art will appreciate that multiple services monitors, e.g. 309, could be used to provide the communication services, where some locations of the retail business 100 have a service monitor 309, while other locations do not have a service monitor 309.

Figure 4:
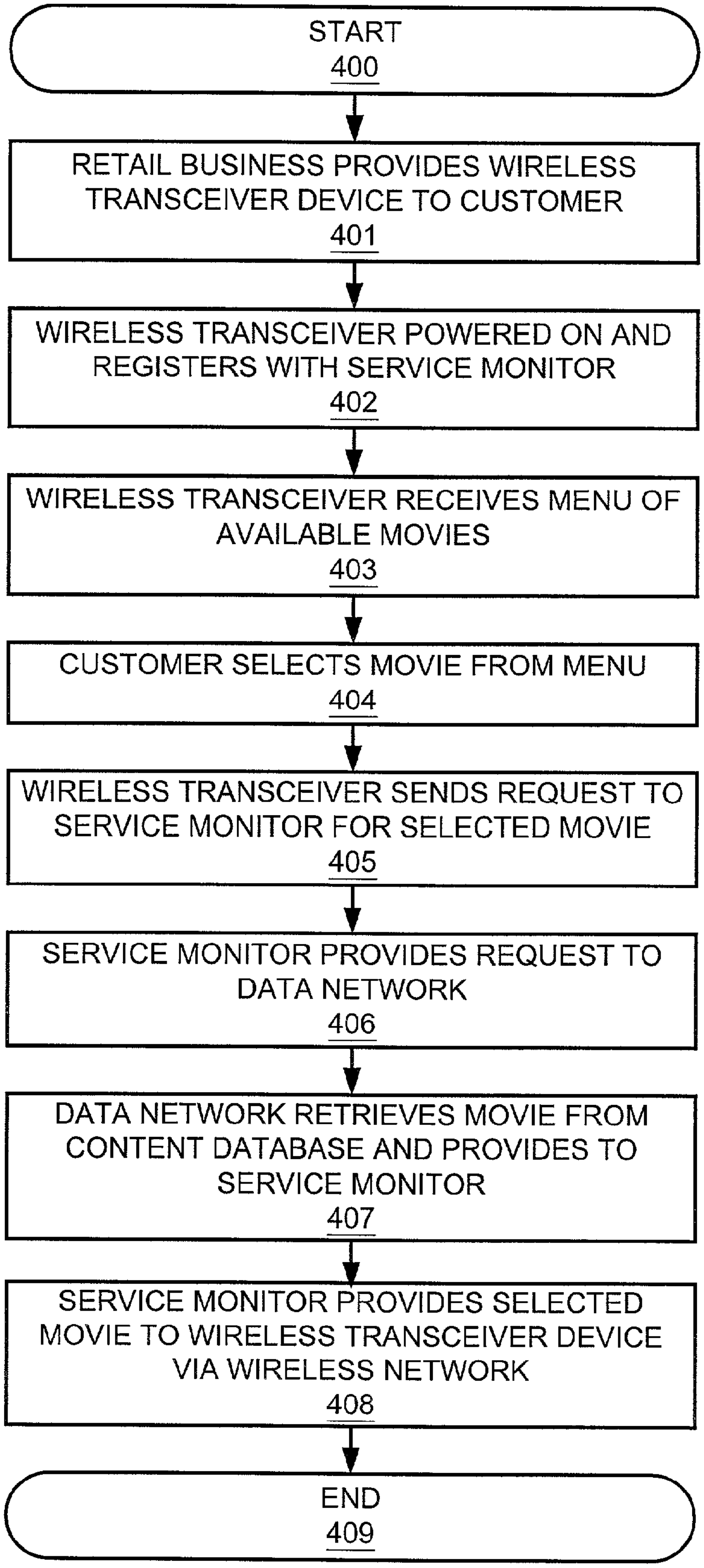
FIG. 4 is a flow chart illustrating another example of the method of the present invention.

FIG. 4 is a flow chart illustrating another example of the method according to the present invention. On FIG. 4 the method begins at step 400 in response to a customer visiting the retail business 100 looking for one or more of the plurality of different communication services offered by the retail business 100 under a contract with network system 101. For purposes of this example, the retail business 100 is a video rental business and the customer visits the retail business 100 for a video on demand service. At step 401, the retail business 100 provides the customer with the wireless transceiver device 303, a high resolution portable video display system, in exchange for a rental fee. The customer returns to the customer location 103 with the wireless transceiver device 303. At step 402, the customer powers on the wireless transceiver device 303 and the wireless transceiver device 303 registers with the service monitor 309 in a conventional manner. In response to the registration, the wireless transceiver device 303 receives a menu that permits the customer to select one of a plurality of available movies at step 403. At step 404, the customer selects a movie option from the menu. In response to the menu selection, the wireless transceiver device 303 sends a request message to the service monitor 309 that includes a request for the selected movie, at step 405. At step 406, the service monitor 309 processes the request message and provides the request message to the data network 305. At step 407, the data network 305 retrieves the selected movie from the content database 306 and provides the selected movie to the service monitor 309. At step 408, the service monitor 309 provides the selected movie to the wireless transceiver device 303 via the wireless network 102, and the operation ends at step 409.

The above-described systems could be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are integrated circuits and logic circuitry. Those skilled in the art are familiar with instructions, processors, and storage media.

Those skilled in the art will appreciate variations of the above described embodiments that fall within the scope of the invention. As a result, the invention is not limited to the specific examples and illustrations discussed above, but only by the following claims and their equivalents.

I claim:

1. A method for providing communication services, the method comprising:

at a retail business, providing a wireless transceiver device to a customer of the retail business, wherein the wireless transceiver device is configured to receive at least one of a plurality of different communication services and provide the at least one of the plurality of different communication services to the customer of the retail business;

receiving in at least one location of the retail business, the plurality of different communication services from a network system;

in response to providing the wireless transceiver device to the customer of the retail business, receiving in the at least one location of the retail business a request from the wireless transceiver device for the at least one of the plurality of different communication services; and at the at least one location of the retail business, processing the request for the at least one of the plurality of different communication services; and in response to processing the request, providing the at least one of the plurality of different communication services from the at least one location of the retail business to the wireless transceiver device over a wireless network.

2. The method of claim 1 wherein providing the at least one of the plurality of different communication services from the at least one location of the retail business comprises:

providing the at least one of the plurality of different communication services from the at least one location of the retail business to the wireless network; and providing the at least one of the plurality of different communication services from the wireless network to the wireless transceiver device.

3. The method of claim 1 wherein processing the request for the at least one of the plurality of different communication services comprises:

providing the request for the at least one of the plurality of different communication services to the network system.

4. The method of claim 1 wherein the step of receiving the plurality of different communication services comprises:

contracting for the plurality of different communication services from the network system by the retail business.

5. The method of claim 1 wherein providing the wireless transceiver device to the customer of the retail business comprises:

renting the wireless transceiver device to the customer of the retail business for a predetermined period of time.

6. The method of claim 1 wherein providing the at least one of the plurality of different communication services from the retail business to the wireless network comprises:

contracting for wireless network services from the wireless network by the retail business, wherein the wireless network service is representative of providing the at least one of the plurality of different communication services from the at least one location of the retail business to the wireless transceiver device.

7. The method of claim 1 wherein the plurality of different communication services comprise broadband communication services.

8. The method of claim 7 wherein the broadband communication services comprise video on demand communication services.

9. The method of claim 7 wherein the broadband communication services comprise data exchange communication services.

10. The method of claim 7 wherein the broadband communication services comprise voice communication service.

* * * * *